(12) United States Patent
Hutchison et al.

(10) Patent No.: US 9,172,725 B2
(45) Date of Patent: Oct. 27, 2015

(54) APPARATUS FOR SIGNALING CIRCLE OF FRIENDS

(71) Applicants: James W. Hutchison, Chicago, IL (US); Mitchell A. Carrel, Chicago, IL (US); Robert Matles, Glenview, IL (US); Christine A. Hutchison, Chicago, IL (US); Lauren R. Matles, Glenview, IL (US); Lee M. Whitman, Raleigh, NC (US); Lisa A. Brinkman, Chicago, IL (US)

(72) Inventors: James W. Hutchison, Chicago, IL (US); Mitchell A. Carrel, Chicago, IL (US); Robert Matles, Glenview, IL (US); Christine A. Hutchison, Chicago, IL (US); Lauren R. Matles, Glenview, IL (US); Lee M. Whitman, Raleigh, NC (US); Lisa A. Brinkman, Chicago, IL (US)

(73) Assignee: PROXFINITY, INC., a Delaware Corporation, Chicago, IL (US)

( * ) Notice: Subject to any disclaimer, the term of this patent is extended or adjusted under 35 U.S.C. 154(b) by 123 days.

(21) Appl. No.: 13/858,620

(22) Filed: Apr. 8, 2013

(65) Prior Publication Data
US 2013/0282818 A1 Oct. 24, 2013

Related U.S. Application Data

(63) Continuation of application No. 12/636,162, filed on Dec. 11, 2009, now Pat. No. 8,417,777.

(51) Int. Cl.
*H04L 29/06* (2006.01)
*G06Q 30/02* (2012.01)

(52) U.S. Cl.
CPC ............... *H04L 65/10* (2013.01); *G06Q 30/02* (2013.01)

(58) Field of Classification Search
CPC ............................ H04L 65/10; H04L 65/1093
USPC ......................................................... 709/204
See application file for complete search history.

(56) References Cited

U.S. PATENT DOCUMENTS

| | | | |
|---|---|---|---|
| 6,549,768 B1 | 4/2003 | Fraccaroli | |
| 7,809,805 B2 | 10/2010 | Stremel et al. | |
| 7,857,225 B2 * | 12/2010 | Challa et al. | 235/462.45 |
| 8,204,437 B1 | 6/2012 | Rothschild | |
| 8,224,351 B1 * | 7/2012 | Sushkov et al. | 455/456.1 |
| 8,266,667 B2 * | 9/2012 | O'Donnell et al. | 725/133 |
| 8,302,166 B2 * | 10/2012 | Balakrishnan et al. | 726/5 |
| 2001/0051517 A1 | 12/2001 | Strietzel | |
| 2002/0090954 A1 | 7/2002 | Tanaka et al. | |
| 2004/0014486 A1 | 1/2004 | Carlton et al. | |
| 2004/0203363 A1 | 10/2004 | Carlton et al. | |
| 2005/0038876 A1 | 2/2005 | Chaudhuri | |
| 2005/0174975 A1 | 8/2005 | Mgrdechian et al. | |

(Continued)

OTHER PUBLICATIONS

Eagle, Nathan, et al., "Social Serendipity: Proximity Sensing and Cueing", MIT *Media Laboratory Technical Note 580*, May 2004.

*Primary Examiner* — Kristie Shingles
(74) *Attorney, Agent, or Firm* — Leydig, Voit & Mayer, Ltd.

(57) ABSTRACT

A device and method is provided for signaling an affinity of a peer device. According to one embodiment, the device receives a wireless signal from the peer device and determines the presence of the peer device based on the received signal. The device is able to detect the peer device when the peer device is within the vicinity or a certain proximity of the device. The received signal carries an affinity code of the peer device so that the device can detect the affinity of the peer device by comparing the received affinity code with its preset affinity code. If the two affinity code match, the device generates an the user to the presence of another user and signals that the two users share the same affinity.

18 Claims, 6 Drawing Sheets

(56) References Cited

U.S. PATENT DOCUMENTS

| | | |
|---|---|---|
| 2006/0100892 A1 | 5/2006 | Ellanti |
| 2008/0056215 A1 | 3/2008 | Kopikare et al. |
| 2008/0086261 A1 | 4/2008 | Robinson et al. |
| 2008/0182591 A1 | 7/2008 | Krikorian |
| 2008/0214166 A1 | 9/2008 | Ramer et al. |
| 2008/0270551 A1 | 10/2008 | Flake et al. |
| 2008/0288355 A1 | 11/2008 | Rosen |
| 2009/0275348 A1 | 11/2009 | Weinreich et al. |
| 2009/0325712 A1 | 12/2009 | Rance |
| 2011/0055930 A1 * | 3/2011 | Flake et al. .............. 726/27 |

* cited by examiner

APPARATUS FOR SIGNALING CIRCLE OF FRIENDS

CROSS REFERENCE TO RELATED APPLICATIONS

This patent application is a continuation of U.S. application Ser. No. 12/636,162, filed Dec. 12, 2009, (NOW U.S. Pat. No. 8,417,777) entitled "Apparatus for Signaling Circle of Friends", the contents of which are expressly incorporated herein by reference in their entirety, including any references therein.

FIELD OF THE INVENTION

The present invention relates generally to a signaling device, and more particularly to an apparatus for notifying its user of a presence of another user sharing an affinity.

BACKGROUND OF THE INVENTION

In any social event, including but not limited to a pre-arranged gathering or a random encounter, people usually like to identify themselves as belonging to a certain group or an organization. The members of such a group or organization usually share a common interest or a goal and therefore are willing to identify other members who are also present. However, in many situations, this is not an easy task. For example, at a music concert, the members of a music club or a group of friends would like to know if there are any other members nearby. Unless these group members know one another and agree upon a time and place beforehand to meet at the concert, it is almost impossible to know and detect the presence of the other members or friends. Although these group members can wear an outfit or other personal items that signal their affiliation or affinity, it is still difficult for them to visually detect and recognize one another, particularly in crowded environments. It is therefore desirable to notify a person to the presence of another person sharing the same affinity or interest.

BRIEF SUMMARY OF THE INVENTION

Described herein are various embodiments of an invention for signaling an affinity. Within the context of this description, the term "affinity" refers to the affiliation of a person with an interest group, i.e., a group of people who have a common interest.

In one embodiment, the interest group may include, but is not limited to, a sports team, a group of fans of the sports team, a professional organization, a political group, a group of people self-organized for a particular event, such as a concert, a campaign, a festival, etc. In another embodiment, the interest group may only include two persons who share a common goal. For example, in a dating event, the interest group includes two persons who agree to meet each other and wish to establish a relationship. After reading this description, one skilled in the art will readily recognize that other forms of the interest group are within the context of this invention.

In keeping with the above embodiments and for ease of reference, the term "an affinity of a device" refers to the affinity of a user of the device, which in turn refers to the affiliation of the user with a certain interest group.

According to some embodiments, a device for signaling an affinity comprises a receiver for receiving a signal transmitted by a peer device, a processor for determining an affinity of the peer device in accordance with the signal, and a signal generator for generating a notification indicative of the affinity of the peer device in response to the received signal.

In keeping with these embodiments, the signal carries an affinity code indicative of the affinity of the peer device. The affinity of the peer device indicates an affiliation of a user of the peer device with an interest group.

In some further embodiments, the device further comprises a memory for storing a predetermined affinity code indicative of an affinity of the device. The device may include a transmitter for transmitting an outgoing signal carrying the predetermined affinity code associated with the device. The device further includes an input interface for receiving the predetermined affinity code input by a user for storing in the memory. The receiver further receives the predetermined affinity code for storing in the memory.

According to one embodiment, the processor determines that the affinity code of the peer device matches the predetermined affinity code and generates a triggering signal for triggering the notification.

According to some other embodiments, the processor further determines that the peer device is within a vicinity of the device based on a characteristic of the received signal. The characteristic of the received signal includes the strength of the received signal. The notification further indicates that the peer device is within the vicinity of the device.

According to another embodiment, the device further comprises a housing affixed to a user, wherein the receiver, the processor, and the notification generator are attached to the housing.

According to some further embodiments, the device comprises a position locator for determining the location of the device. The position locator may include a receiver for receiving a signal indicative of the location of the device. The position locator can receive signals from a communications network and determines the location of the device based on the signals. Alternatively, the signal further carries information of the location of the peer device and the processor determines the distance between the device and the peer device based on the location of the device and the location of the peer device.

According to still another embodiment, the signal generator includes a light source and the notification may include a light signal. Alternatively, the signal generator includes a sound generator and the notification may include a sound signal. Still alternatively, the signal generator may include a display unit for displaying the affinity code of the peer device and information of a user of the peer device.

According to some embodiments, a device for signaling an affinity of a peer device includes a detector for determining the presence of the peer device and the affinity of the peer device, and a notification generator for generating a notification signal indicative the affinity of the peer device in response to the determination results.

According to some further embodiments, the device is associated with a predetermined affinity and wherein the detector determines that the affinity of the peer device matches the predetermined affinity of the device. In addition, the affinity of the peer device is indicated by an affinity code associated with the peer device and the predetermined affinity of the device is indicated by a predetermined affinity code. The detector determines the presence of the peer device through a wireless connection between the device and the peer device and receives the affinity code of the peer device through the wireless connection.

In an alternative embodiment, the detector detects the presence of the peer device in accordance with a characteristic of the wireless connection. The characteristic of the wireless connection includes the strength of the wireless connection and the detector determines that the strength of the connection is above a threshold.

In some embodiments, the detector determines the affinity of the peer device by comparing the affinity code of the peer device and the predetermined affinity code of the device. The detector then determines a match between the affinity code of the peer device and the predetermined affinity code of the device and generates a triggering signal indicative of the match. The notification generator then generates the notification signal in response to the trigger signal. According to some further embodiments, the notification signal includes at least one of a light signal, a sound signal, and a text message.

In some alternatively embodiments, a method is provided for signaling an affinity of a peer device. The method includes detecting the presence of a peer device, determining the affinity of the peer device in response to the presence of the peer device, and generating a notification indicative of the affinity of the peer device.

According to a further embodiment, detecting a presence of the peer device further comprises receiving a signal carrying the affinity code of the peer device through a wireless connection terminated by the peer device, and detecting the presence of the peer device in accordance with a characteristic of the received signal. The characteristic of the received signal indicates proximity of the peer device.

According to still a further embodiment, the method comprises comparing the affinity code of the peer device with the predetermined affinity code, determining that the affinity code of the peer device matches the predetermined affinity code, and generating a triggering signal for triggering the notification signal. The notification signal includes at least one of a light signal, a sound signal, and a text message.

DETAILED DESCRIPTION OF THE INVENTION

Figure 1A:
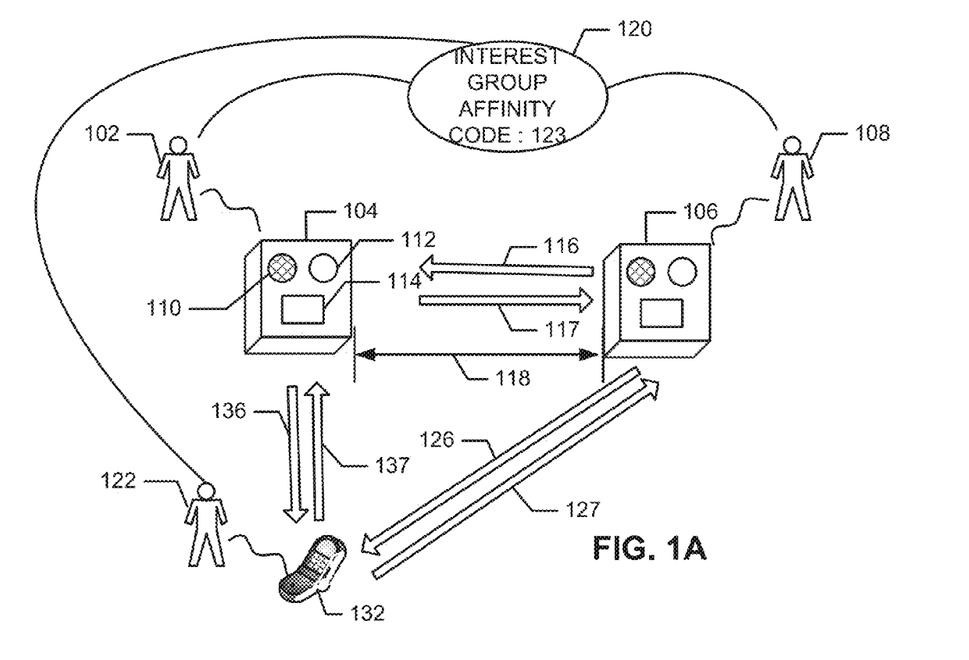
FIG. 1A depicts a plurality of users associated with an interest group, where the devices carries by the users signals the affinity and presence of the other users.

Now turning to the drawings and referring to FIG. 1A, a device 104 is provided for notifying its user 102 of the affinity of another user 108 carrying a peer device 106.

As depicted in FIG. 1A, users 102 and 108 both belong to interest group 120, which may include one or more additional users such as user 122. The interest group is assigned an affinity code (e.g., affinity code "123"), which is used by the group members to identify other group members. The affinity code "123" is merely used here as an example. In practice, the code can take a variety of forms including any characters or numbers.

According to one embodiment, devices 104 and 106 may be issued to the users by the interest group 120 with the infinity code "123" already stored therein. Alternatively, the users can purchase the devices on the market and enter the infinity code into the device based on their need, such as prior to a concert or a sports event.

As shown in FIG. 1A, the device 104 is designed to listen to signal 116 transmitted by device 106. Accordingly to one embodiment, device 106 broadcasts the signal automatically and continuously. Alternatively, it transmits the signal in a specific direction. Still alternatively, signal 116 is transmitted by device 106 intermittently.

In addition, signal 116 carries the infinity code "123" which identifies the user 108 as affiliated with interest group 120. Signal 116, which is suitable for communications, is transmitted from device 106 to device 104 via a wireless channel between the two devices. According to this embodiment, signal 116 allows device 104 reliably establish a wireless connection with device 106 when device 104 is within the range of signal 116. That is, when distance 118 between devices 104 and 106 is smaller than the range of the signal 116, the device 104 can detect the presence of the device 106 based the transmitted signal 116.

In this embodiment, the affinity code "123" may be carried by the signal 116 in the form of data packets similar to those in the art of wireless networks. Alternatively, the affinity code is carried by the signal 116 by way of signal modulation techniques. Other techniques suitable for carrying the affinity code in signal 116 can also be implemented in the devices described herein.

When the two devices are in range and the device 104 receives the signal 116, device 104 extracts the affinity code from the received signal and compares the extracted code with its own affinity code. As shown in FIG. 1A, because users 102 and 108 belong to the same interest group and therefore share the same affinity code, device 104 determines that the code associated with device 106 matches its own affinity code, thereby recognizing user 108 to be one of the members of interest group 120. Device 104 then generates an notification signaling to its user 102 that another user 108 is within his/her vicinity so that user 102 can proactively search for and identify user 108.

As shown in FIG. 1A, the notification generated by the device 104 may take various forms. For example, the device 104 may include a light source 112 for generating a light signal indicating the presence and the affinity of the user 108. Alternatively, the device 104 may include a sound generator 110 for generating a voice signal to signal the user 102 to the presence and the affinity of user 108. Still alternatively, the device 104 may include a display device 114 for displaying a text or pictorial message indicating the presence and the affinity of the user 108. Still alternatively, the notification may be in the form of vibrations generated by a circuit embedded in device 104. Still alternatively, the device 104 may include a combination of these or other signaling mechanisms suitable for notifying the user.

As discussed above, device 104 is able to detect that the user 108 is in the vicinity of the user 102 when the device 104 is within the range of the signal 116. In an open space such as a concert hall or a stadium, the signal range is determined primarily by the power of the signal. For example, if the signal 116 takes the form of a Bluetooth signal, then a maximum power of 100 mW is equivalent to a range of about 100 meters, whereas a maximum power of 2.5 mW is equivalent to a range of about 10 meters. It should be readily clear to one skilled in the art that the range of the signal 116 determines the geographical area within which the device 104 is able to detect the presence of device 106. Specifically, the larger the signal range, the larger the maximum distance for device 104 to reliably detect the presence of device 106. On the other hand, while a smaller signal range offers a smaller detection distance, it helps user 102 to more easily spot user 108 because, for device 104 to produce the notification, device 106 (and user 108) must be more proximate to device 104 (and user 102).

According to another embodiment, the device 104 may generate the notification in a way to help user 102 determine if user 108 is approaching or leaving so that user 102 can recognize user 108 more easily in a crowded environment or in an open space. For example, the light source 112 may generate a series of light pulses, when device 104 detects that the user 108 is in range and that device 106 shares the same affinity code. In addition, device 104 is able to determine the movement or motion of device 106 so that when user 108 approaches user 102, device 104 will increase the pulse frequency to signal user 102 that another person in the same interest group is approaching. When user 108 is moving away from user 102, device 104 decreases the pulse frequency. Similarly, speaker 110 may generate a series of "beeps" and adjust the frequency or the volume of the "beeps" according to user 102's movement. Still similarly, the display 114 may generate a text message indicating whether the other group member 108 is approaching or leaving.

According to another embodiment, the device 104 may determine whether to generate the notification by analyzing certain characteristic of signal 116. For example, signal 116, when received by device 104, has a signal strength indicating how strong the signal is after traveling through distance 118 from device 106 to device 104. Mathematically, the strength of signal 116 may be presented by the amplitude of the underlying radio wave or other physical parameters. Accordingly, device 104 analyzes the received signal 116 and determines if the signal strength is above a predetermined value. When the strength of the signal 116 is at or above the threshold and the affinity code carried by the signal matches the affinity code of device 104, device 104 generates the notification.

In this embodiment, because the signal strength is determined by the distance traveled by the signal 116, adjusting the threshold value will change the area (or range) for device 104 to signal the presence and affinity of device 106. In other words, increasing the threshold will decrease the area (or range) for the notification to be triggered, because a stronger received signal is required to reach the predetermined threshold. On the other hand, decreasing the threshold will increase the area (or range) for the notification to be triggered, because a lower signal strength is sufficient to reach the threshold.

According to another embodiment, device 104 is able to determine the distance 118 between devices 104 and 106 by comparing its own location with the location of peer device 106. Specifically, device 104 can determine its own location using a positioning system by receiving and analyzing a signal such as a GPS signal or other suitable positioning signals. Alternatively, the device 104 can also determine its location by performing a triangulation based on signals received from a communications network. On the other hand, device 106 can also determine its location using similar mechanisms and impart or encode its location into signal 116 for transmission to other peer device.

When device 104 receives signal 116, it extracts the affinity code as well as the location of device 106 from the received signal. Device 104 then calculates the distance 118 between the two devices by comparing its own location with the location of device 106. If the affinity codes of devices 104 and 106 match each other and the calculated distance 118 is less than a predetermined value, device 104 generates an notification to signal user 102 to the presence of user 108 and his/her affiliation with interest group 120.

Compared with other embodiments, this embodiment offers a more accurate distance calculation because the locations of the devices 104 and 106 can be measured very accurately with in a margin of error of only a few feet or less. Because of this advantage offered by the positioning functionality, device 104 is able to not only signal user 102 to the presence and affinity of user 108 as describe above, but also to provide user 102 with precise information about user 108's position and movements such as the distance 118 between the two users, the traveling speed of user 108, the traveling direction of user 108, and the time for user 108 to arrive at user 102's location at the current speed, etc.

Furthermore, as describe above, device 104 can also generate the notification having a certain pattern, such as a series of light pulse or "beeps," and adjust the pattern according to the change of distance 118 or the movements of user 108.

According to anther embodiment, device 104 may calculate distance 118 selecting any one of the techniques described above, depending on the availability of the signals. For example, in an outdoor space where there is no obstruction blocking the signals, device 104 choose to use the positioning technique to detect the presence of user 108. On the other hand, in an enclosed indoor space where external signal is unavailable, device 104 can user signal 116 to determine the distance 118 and detect the presence of user 108 accordingly.

As further depicted in FIG. 1A, the signaling devices described above may be integrated in a cell phone or smart phone 132. Alternatively the smart phone 132 may be programmed or may carry an application for providing the signaling functionalities described above. For example, the cell phone 132 carried by user 122 includes an application for signaling the presence and affinity of user 108 who carries device 106. Similar to the operation described above, when the distance between devices 132 and 108 is within the range of signal 126 transmitted by device 108, cell phone device 132, as enabled by the program running on it, is able to detect the presence and affinity of the device 106 by analyzing received signal 126. If, as FIG. 1A shows, users 122 and 108 are both affiliated with interest group 120 and devices 132 and 106 both store the affinity code "123," which identifies the interest group 190, phone device 132 generates a notification to notify user 122 of the presence and the affinity of user 108. For example, phone device 132 may display on its screen a text message showing the information of user 108 such as name, age, gender, membership information with respect to interest group 120, etc. It may also vibrate or generate a sound signal as described above.

According to one embodiment, signals 116 and 126 are different portions of the same signal broadcasted by device 106. Alternatively, signals 116 and 126 are different types of signals or the same type of signal having different characteristics.

As further depicted in FIG. 1A, devices 104 and 132 not only receive singles from device 106, they can also transmit signals to device 106 so that device 106 can detect their presence as well. Signals 117 and 127 illustrates the signals transmitted by devices 104 and 132 respectively. Similar to the operations described above, when device 106 receives signal 117 or 127, it extracts the affinity code associated with device 104 or 132, compares it with its own affinity code, and determines the affinity of user 102 or 122. Device 106 then generates notifications to notify user 108 of the presence and affinity of user 102 or 122.

Similarly, devices 104 and 132 can also detect the presence and the affinity of each other through signals 136 and 137 transmitted between them.

According to a further embodiment, when more than two devices come into a range or area that allows them to detect the presence and affinity of one another, each of them can also detect the number of peer devices residing within its own vicinity. For example, as depicted in FIG. 1A, device 104 detects through singles 116 and 137 that devices 106 and 132 are present within the range and that their users (i.e., user 108 and 122) are associated with the same interest group identified by affinity code "123." In this situation, each one of signals 116 and 137 carries not only the affinity code of their respective users 108 and 122, but also a unique identification that identifies the individual device. The identification, when extracted by device 104, allows device 104 to differentiate device 106 from device 132. Accordingly, device 104 generates a notification similar to those described above, as well as displays a number (e.g., "2") indicating the total number of peer devices that are currently present within its own vicinity. Similarly, devices 106 and 122 can each detect the other peer devices by analyzing signals 117, 126, 127, 136, and 137. It goes without saying that when more than three devices, which are all associated with interest group 129, are present within an area, each of these devices can detect any other peer devices and notify its own user of the affinity of these other users and the number of peer devices currently residing with the predetermined range or area.

Figure 1B:
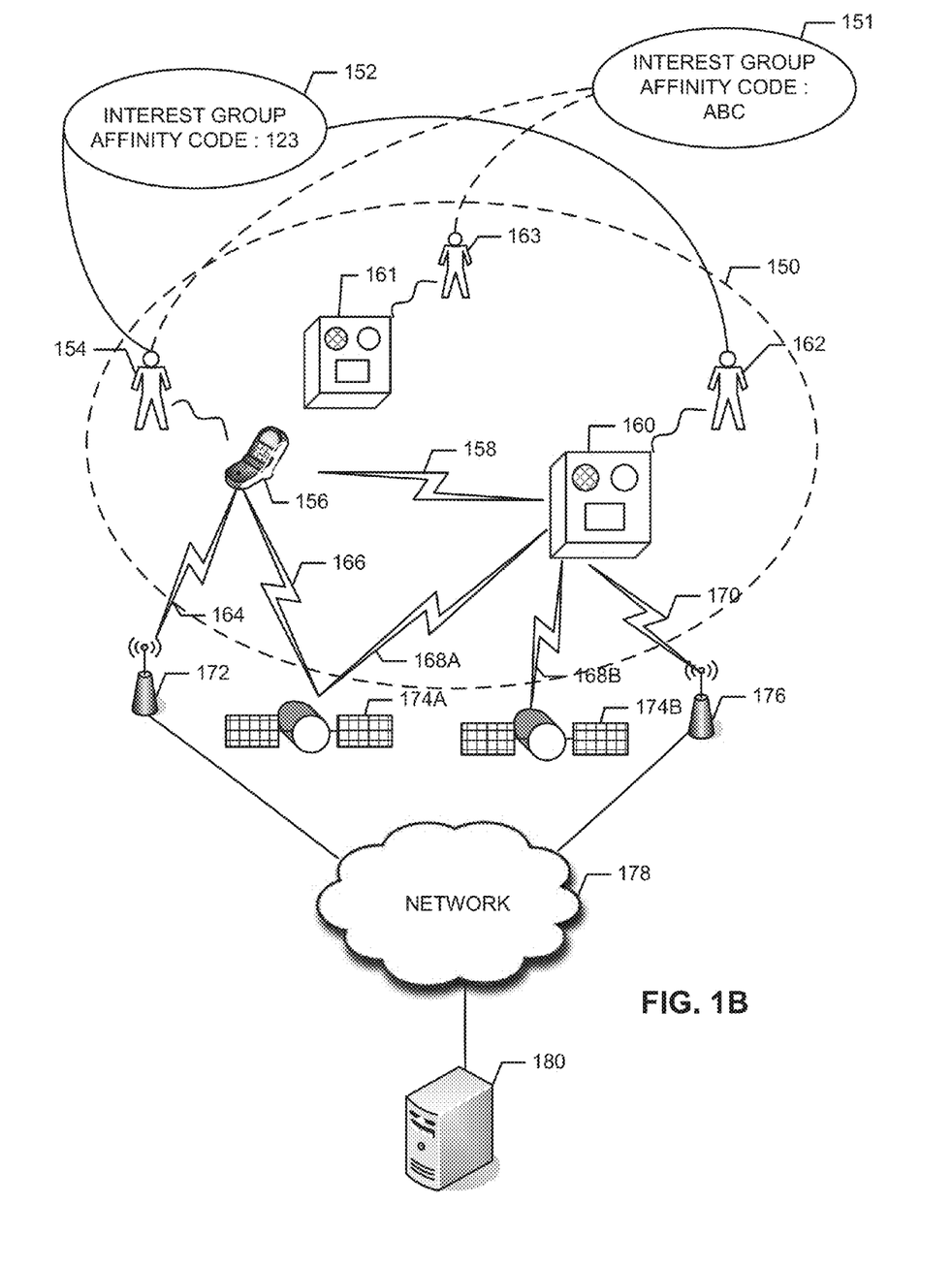
FIG. 1B depicts the peer devices communicates through communication networks and satellite systems.

Now turning to FIG. 1B, it shows another embodiment where, in addition to transmitting signals between each other, peer devices 156 and 160 can also communicate with one or more communication networks to determine the presence and affinity of each other or other peer devices.

As depicted in FIG. 1B, device 156 is carried by user 154 associated with interest group 152. Similarly, device 160 is carried by user 162 who is also associated with interested group 152. Devices 156 and 160 can each communicate with satellites 174A and 174B.

Accordingly, device 156 obtains its own location information via a satellite signal 166 from satellite 174A and transmits its own location information to device 160 via signal 158. Similarly, device 160 obtains its location information via a satellite signal 168A from satellite 174A, or via a satellite signal 168B from satellite 174B. Upon receiving affinity code and the location information from device 156, device 160 first determines if the affinity code of device 156 matches its own affinity code. When the affinity codes match, device 160 then calculates the distance between the two devices by comparing the location information received from device 156 and its own location information. If the distance is within a predetermined area 150, device 160 generates a notification similar to those described above so that user 162 is aware of the presence of user 154 who shares the same affinity. By way of similar operations, device 156 can notify user 154 of the presence and affinity of user 162 as well.

Alternatively, as further depicted in FIG. 1B, devices 156 and 160 can communicate with each other via a network 178 and wireless towers or access points 172 and 176. In this case, devices 156 and 160 each determine their own location information through satellite signals as described above, or through signals 164 and 170 from wireless towers or access points 172 and 176 (e.g., through the wireless triangulation technique). Devices 156 and 160 then transmit their location information to each other through wireless towers or access points 172 and 176 and network 178. Devices 156 and 160 then determine and notify their users of each other's affinity and presence within the area 150 by comparing the affinity codes and location information as described above.

Alternatively, devices 156 and 160 can further communicate with a server 180 through network 178 and wireless towers or access points 172 and 176. For example, both devices 156 and 160 are registered with server 180, which stores and manages information of all the devices and users in the system such as user IDs, device IDs, user profiles, current location of each device, interest groups with which each user is associated, the affinity code of each interest group, etc. After determining their own locations, devices 156 and 160 transmits their location and other related information (e.g., their user IDs, device IDs, etc.) to server 180, which is equipped with programs to compare their affinity codes and locations. If their affinity codes match each other and the distance between devices 156 and 160 is within the predetermined range 150, server 180 transmits a signal to each device, thereby triggering the notification.

Additionally, server 180 can transmit the profiles of the users who are also within the predetermined range to devices 154 and 162. Each device then displays the profile of the other user along with the notification to help their users identify each other as well as other group members.

It is readily apparent to one skilled in the art that the size and shape of area 150 can be adjusted to suit the needs of the users. In addition, the system depicted in FIG. 1B can include more than two devices and users. When more than two users carrying their own devices come into area 150, each device can detects the presence and affinities of all other peer devices through any one of the method described above. Each device can generate notifications to notify its user that one or more other users sharing the same affinity are also present within the area 150.

In addition, server 180 depicted in FIG. 1B can be further used to manage a plurality interest groups. For example, server 180 stores a plurality of users, each of whom is associated with one or more interest groups identified by different affinity codes. Accordingly, devices 156 and 160 are equipped with notification generators that generate a different notification for each interest group. For example, in addition to the association with interest group 152, user 154 is also associated with a different interest group 151, which is identified by a different affinity code (e.g., "ABC"). In addition, another user 163 and device 161 present within area 150 is also associated with interest group 151. Accordingly, when detecting the presence and the affinity codes of both devices 161 and 160, device 156 can generate different notifications for devices 161 and 160 so that user 154 recognizes that there are members from more than one of his/her interest groups within the area.

Figure 1C:
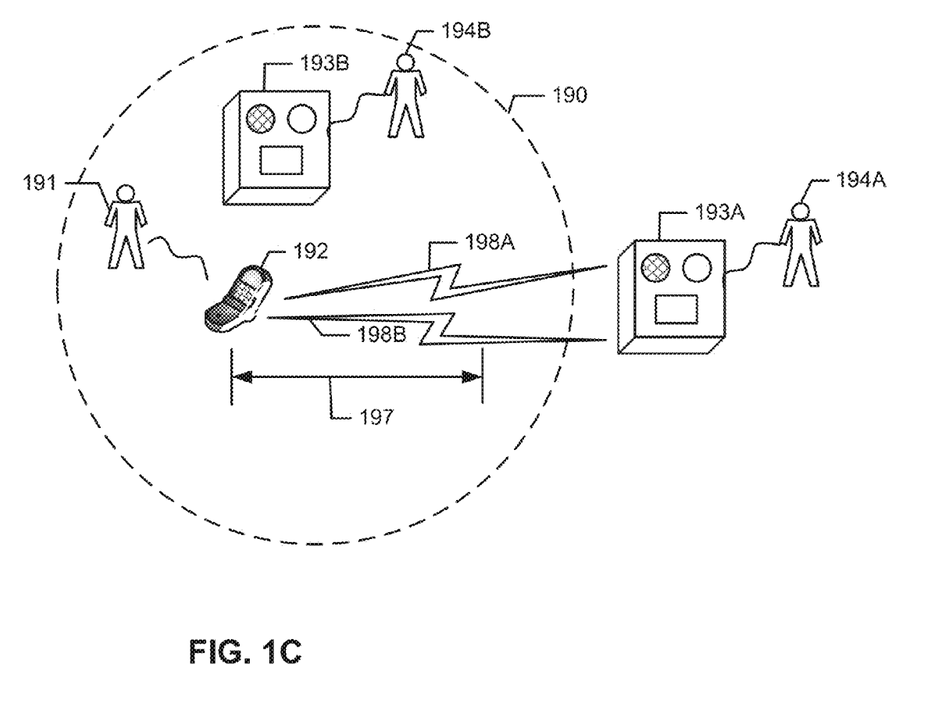
FIG. 1C depicts a device that generates a notification when a peer device moves outside of a predetermined area of range.

FIG. 1C depicts another embodiment, where a device notifies its users when a user from the same interest group moves outside of the predetermined area 190 or breaks a predetermined distance 197. As depicted in FIG. 1C, users 191 and 194 are associated with an interest group. When device 192 detects that user 194A as well as device 193A has moved too far away, either outside of the predetermined range 197 or the predetermined area 190, both device 192 and 193A generates a notification to notify their users 191 and 194A of the movements of user 194A.

Such detection can be achieved by using any of the methods described above. For example, device 192 monitors the strength of signal 198A, which decreases as device 193A moves further away from device 192. When the strength diminishes to a level lower than a predetermined value, device 192 determines that device 193A is outside of the predetermined range, thereby triggering the notification. Similarly, device 193A monitors the strength of signal 198B transmitted by device 192 and triggers the notification when the signal strength is lower than the predetermined level.

Alternatively, device 192 and device 193A can detect each other's movements via satellite signals or wireless signals similar to those depicted in FIG. 1B, such as signals 166, 168A, 168 B, 164 and 170.

Similar to FIGS. 1A and 1B, more than two devices, such as devices 192, 193A and 193B, within the same area, can communicate with one another. When any one of the devices such as devices 193A moves outside of the area, other devices generate notifications to signal to their users that device 193A (and its user 194A) has moved outside of the area. Furthermore, devices 192 and 193B can display the information of the user who is moving away from area 190 (e.g., user 194A) to help users 191 and 194B identify user 194A.

Additionally, a server similar to that depicted in FIG. 1B can be used to manage all of the devices and users. As described above, these devices including devices 192, 193A and 193B can communicate through the server to determine the movements of the other peer devices and notify their users when any peer device moves outside of the area.

Figure 2A:
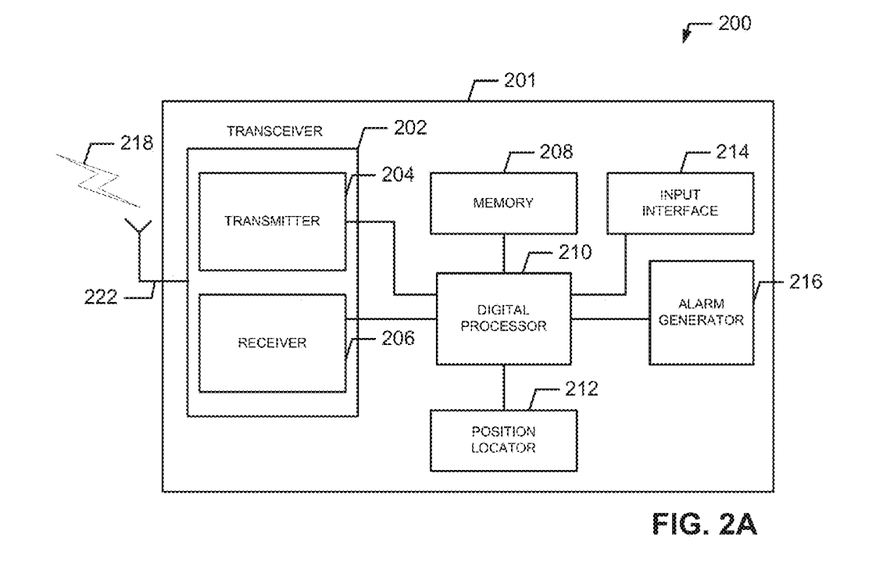
FIG. 2A depicts one embodiment of the device for signaling the affinity of a peer device.

FIG. 2A depicts a block diagram showing the internal structure of a device 200 for signaling the presence and affinity of a peer device. The structure described herein can be implemented in any of the devices shown in FIGS. 1A, 1B, and 1C.

Specifically, in order to provide the signaling functionalities described above, the device 200 includes a transmitter 204, a receiver 206, an antenna 222, a processor 210, and a notification generator 216. Some further embodiments of the device 200 also include a memory module 208, a position locator 212, an antenna 224, and an input interface 214.

Each module depicted in FIG. 2A can be implemented as a standalone circuit such as an integrated circuit (IC) for providing various functionalities described herein. Alternatively, two or more modules can be integrated in to one IC for providing the multiple functionalities. For example, transmitter 218 and the receiver 206 may be integrated into a transceiver 202 for transmitting and receiving wireless signals. In some other embodiments, the processor 210 and the transceiver 202 are integrated into one detector module.

As shown in FIG. 2A, the processor 210 is connected to other components for transmitting and receiving data. Specifically, the receiver 206 is able to receive a signal such as signal 218 transmitted by a peer device and convert the received signal into data for processor 210 to analysis. The processor 210 receives the data from the receiver 206, analyzes the data and extracts the affinity code from the data. The processor 210 then compares the extracted affinity code with a predetermined code associated with device 200 and determines whether the peer device from which the signal 218 is received is associated with the same affinity code. If the extracted affinity code is identical to the predetermined code, the processor 210 then generates a triggering signal to trigger the notification generator 216, which in turn generates a notification.

The transmitter 204 is able to transmit via antenna 222 outgoing signals which carry the predetermined affinity code associated with device 200.

As described above, the notification generator 216 may include a light source such as LEDs, a sound generator such as a speaker, a display device, or a combination of these devices, similar to 110, 112, and 114 depicted in FIG. 1A.

The predetermined affinity code may be stored in the internal registers of the processor 210 or the memory 208 which is accessed by the processor 210 for reading and writing data. In addition, the memory 208 can also store user information such as the user's name, address, date of birth, interest group, etc. This information can be read by the processor 210 and then transmitted through transmitter 204 and antenna 222 to peer devices.

Device 200 may further include an input interface 214 for receiving user inputs. For example, the input interface 214 may be a physical keypad for the user to input the predetermined affinity code and other user information such as user's name and phone number directly into the device. The user can also use the keypad to adjust the light pattern, sound pattern, and the characteristics of the display. As another example, the interface 214 includes a communication port such as a USB port for connecting to a computer. A user can update or change the data or configuration of device 200 through operating the computer. For example, the user can input the predetermined infinity code into the computer which in turn transfers the code to device 200 through interface 214. Alternatively, when device 200 is connected to the computer through interface 214, the user can use a program running on the computer to configure device 200 such as changing the light, sound or display pattern. Device 200 can also receive the user information, such as user's name, address, and phone number, from the computer through input interface 214.

According to still some embodiments, device 200 further includes a position locator 212 for determining the location of device 200. The position locator 212 can take the form of a GPS receiver that receives GPS signals from a GPS system and determine the location accordingly. Alternatively, the position locator 212 includes a cellular signals receiver which determines the location of device 200 through the cellular signals transmitted by the cellular network. These positioning devices and techniques are well known in the art and can be readily implemented in device 200.

According to still some embodiments, device 200 further includes a housing 201 and the modules described above are attached or affixed to housing 201. The housing 201 further includes mechanisms for attaching or affixing to users. For example, housing 201 can take a form of a bracelet, a wristband, a belt clip, a necklace, an ear ring, or other bodily worn devices. Alternatively, device 200 can be integrated into other devices such as a cell phone, a PDA, a laptop computer, a wrist watch, etc.

Figure 2B:
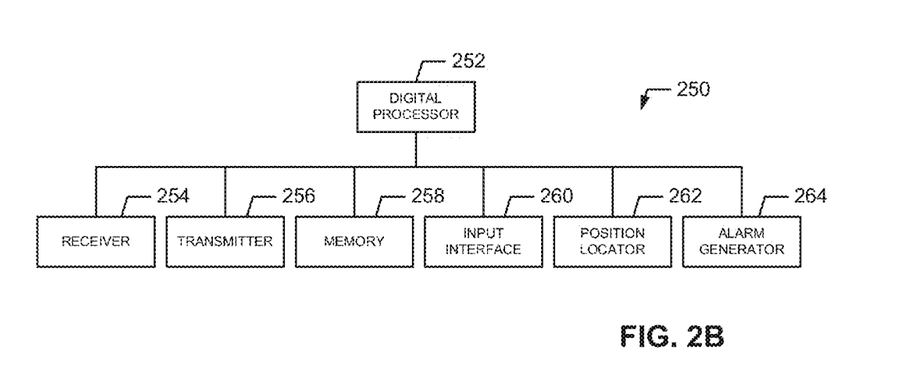
FIG. 2B depicts another embodiment of the device for signaling the affinity of a peer device.

FIG. 2B depicts another embodiment 250 of a device for signaling affinity of a peer device. Unlike device 200 whose processor 210 is connected to other components through different internal interfaces, processor 252 in device 250 is connected to other components through a system bus 266. Data and operation signals are transmitted on bus 266 among processor 252, receiver 254, transmitter 256, memory 258, interface 260, position locator 262, and notification generator 264.

Figure 3A:
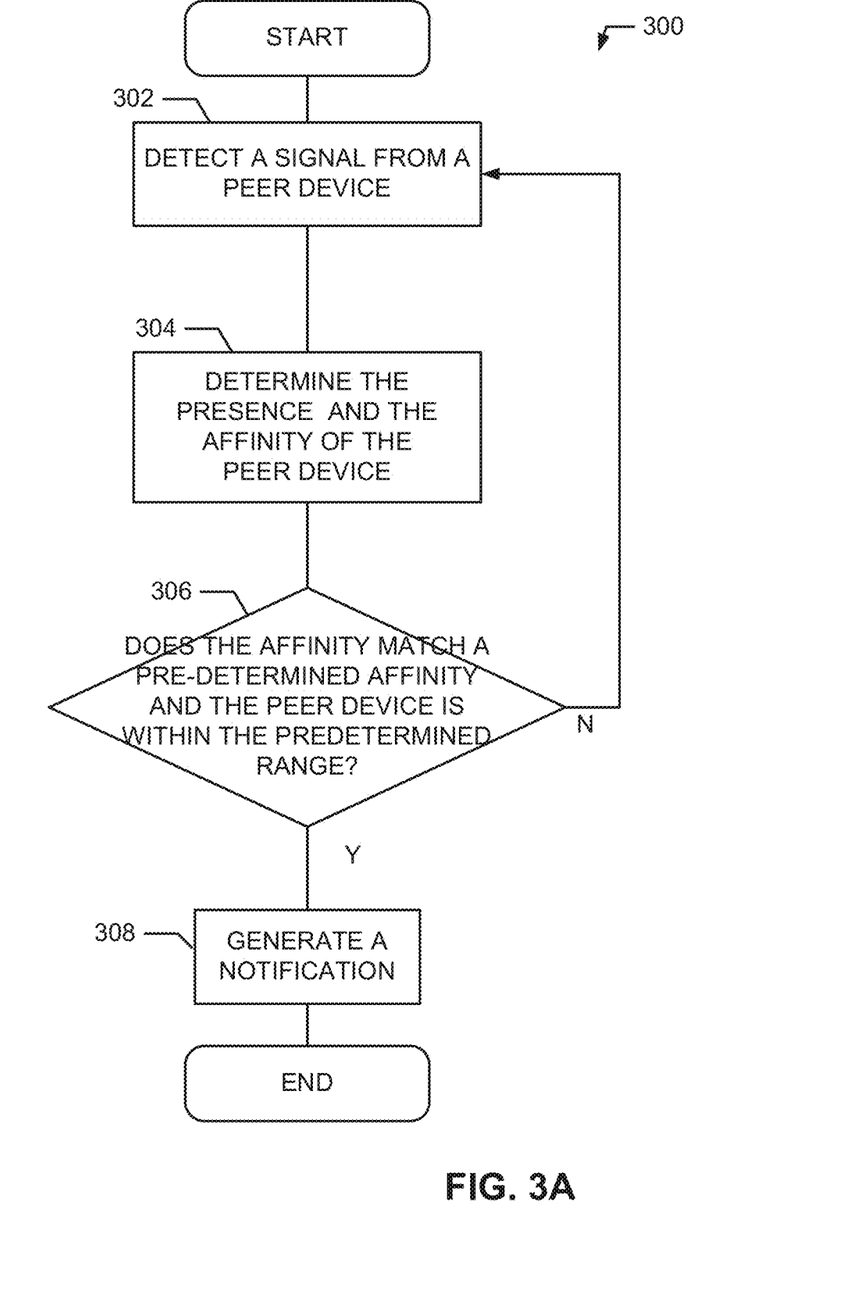
FIG. 3A depicts a process for detecting and signaling the affinity of a user using a peer device.

FIG. 3A illustrates a process 300 that is implemented in a device similar to those depicted in FIGS. 1A-2B for signaling the affinity of a peer device. In particular, at step 302, an incoming signal from the peer device is detected. At step 304, the received signal is used to determine the affinity and presence of the peer device within a predetermined area or range. At step 306, if the peer device is within the predetermine area or range and the affinity of the peer device match a predetermined affinity, the device proceeds to step 308 to notify the user of the presence and affinity of the peer device; otherwise the device goes back to step 302.

According to some further embodiments, the device can use a number of techniques to detect the presence of the peer device at step 306.

For example, the device determines presence of the peer device based on characteristics of the received signal. In one embodiment, the device simply determines the strength of the received signal such as the amplitude or the average power of the underlying radio wave. If the strength of the received signal is above a preset threshold, the device determines that the peer device is within a certain range corresponding to strength of the radio wave.

Alternatively, the device determines the presence of the peer device based on its own location information and that of the peer device. For example, the device first determines its location via a GPS signal. It then determines the location of the peer device from the received signal. The device then calculates the distance between itself and the peer device. If the distance is less than a preset distance value, the device determines the peer device is within the preset range and proceeds to step 308. As another example, the device determines its own location using a mobile positioning technique based on signals received from a communication network. Similarly, the device determines the presence of the peer device by comparing its own location with the location of the peer device obtained from the received signal. The positioning techniques are well known in the art.

As described above, the notification generated by the devices according to process 300 includes a light signal, a voice signal, a text message, a pictorial signal or a combination of these signals. Furthermore, the device is able to adjust the characteristics of these notifications according to the movement of the peer device.

Figure 3B:
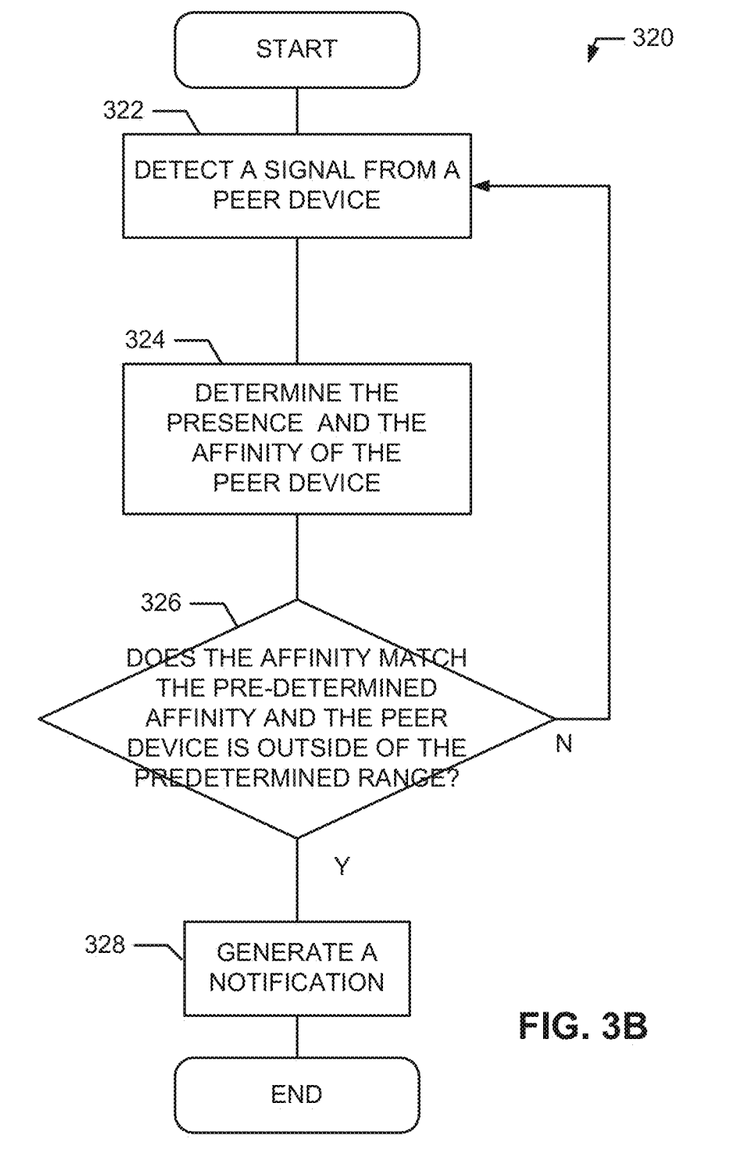
FIG. 3B depicts a process for notifying a user when a peer device moves outside of a predetermined range or area.

FIG. 3B illustrates another process 320 that is implemented in a device similar to those depicted in FIGS. 1A-2B for signaling the affinity of a peer device. The device notifies its user when a peer device sharing the same affinity leaves a predetermined area or move outside of a predetermined range. In particular, at step 322, an incoming signal from the peer device is detected. At step 324, the received signal is used to determine the affinity and presence of the peer device within a predetermined area or range. At step 326, if the peer device is outside of the predetermine area or range and the affinity of the peer device matches a predetermined affinity, the device proceeds to step 328 to notify the user that the peer device is outside of the range; otherwise the device goes back to step 322.

The above described device and process can be integrated in a Circle of Friends Energy Bracelet (Frienergy™) utilizing signals including, but not limited to short or long field radio signals, GPS signals, Bluetooth and Wi-Fi technology to signal the user that another user who shares an affinity is within a specified proximity. Specifically, the bracelet users input an "affinity" code into the electronic device, such as those depicted in FIGS. 1A-2B, affixed to the bracelet, and share that code with other users based on various affinities, such as friendship or membership in a particular club, sports team or other organization. When two or more users sharing an affinity code come within a specified proximity of each other, one of several colored-coded light bands on the bracelet set to correspond to the particular code illuminates, signaling users that a friend or other member of the identified group sharing the code is nearby, and allowing group members to identify one another and announce their presence.

For example, the affinity code can be shared among friends who input it to the device and set it to correspond to the bracelet's blue light band, which then illuminates when two or more friends are situated within fifty feet of each other. This signal creates solidarity and a sense of belonging among the circle of friends, and allows them to announce to themselves and others that the circle of friends is nearby. Similarly, members of a sports team can share a code and select one of the other colors on the light band to identify the team whenever two or more members are within a specified proximity of each other. For romantic interests, a code can be shared and set to correspond to the red light band, which would illuminate to create a light-hearted sense of attraction and unity.

In addition to different colors, flashing light or patterns of shifting colors can be used to identify affinity groups. This embodiment can be used for entertainment purposes at rock concerts or other venues where group members can enjoy publicizing and visualizing their presence, and even aid members of the group in locating one another in light-deprived or loud venues where cell phones and other means of communication are difficult to use.

As another example, a college football website can post the code for the coming weekend's away game. The fans of team can then input the code to their devices and use the devices to identify one another around town, in bars, or in restaurants before and after the game. This embodiment can further be extended to employees of large companies, to identify one another at conventions or in other venues involving large numbers of people.

According to another embodiment, the signaling device is coupled to or integrated in a cell phone or PDA, which can be used to send text messages or convey the profiles of group members found to be within certain proximity of one another. This embodiment allows strangers who share a particular affinity to identify one another in real world settings, evaluate one another before introducing them to the other person, and make instant decisions on whether or not to associate with the other person in a given venue. According to this embodiment, a set of codes corresponding to various professions, large memberships of other identifiable national or worldwide groups can be posted to a website before the meeting or conference and used by members to identify one another when traveling or in other situations.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for signaling an affinity with a peer device in a proximate area, the device comprising a processor and a non-transitory processor-readable medium having processor-executable instructions stored thereon, the device being configured, based on the processor-executable instructions being executed by the processor, to:
   receive a signal indicating that the peer device is within a range of the device;
   determine that the peer device shares an affinity in common with the device based on an affinity code of the device matching an affinity code of the peer device, wherein the common affinity is one of a plurality of affinities, each of the plurality of affinities being associated with a different affinity code; and
   display, based on determining that the peer device shares the affinity in common with the device, a visual notification to a user of the device and to a user of the peer device, wherein the visual notification comprises a visual element that does not utilize text, and wherein the device is wearable such that the visual notification is visible to both the user of the device and the user of the peer device;
   wherein the device is further configured to display multiple types of visual notifications.

2. The device of claim 1, wherein the plurality of affinities include at least one of the group consisting of: an affinity corresponding to a group of friends, an affinity corresponding to membership in a club or other organization, an affinity corresponding to an interest of the user of the device.

3. The device of claim 1, wherein the visual notification is provided by a display of the device.

4. The device of claim 1, wherein the visual notification includes a particular color corresponding to the common affinity.

5. The device of claim 1, wherein the visual notification further comprises an additional visual element comprising text corresponding to the common affinity.

6. The device of claim 1, wherein the visual notification does not include any visual elements having text.

7. The device of claim 1, wherein the device is further configured to:
   receive an input registering one or more affinity codes as being associated with the device, wherein the determination of whether a peer device shares an affinity code with the device is based on the one or more affinity codes registered as being associated with the device.

8. The device of claim 1, wherein determining that the peer device shares an affinity in common with the device is based on the received signal, wherein the received signal includes one or more affinity codes of the peer device.

9. A device for signaling an affinity with a peer device in a proximate area, the device comprising:
   a receiver, configured to receive a signal indicating that the peer device is within a range of the device;
   a processor, configured to determine that the peer device shares an affinity in common with the device based on an affinity code of the device matching an affinity code of the peer device, wherein the common affinity is one of a plurality of affinities, each of the plurality of affinities being associated with a different affinity code; and
   a display, configured to display, based on the determination that the peer device shares the affinity in common with the device, a visual notification to a user of the device and to a user of the peer device, wherein the visual notification comprises a visual element that does not utilize text, and wherein the device is wearable such that the visual notification is visible to both the user of the device and the user of the peer device;
   wherein the display is further configured to display multiple types of visual notifications.

10. The device of claim 9, wherein the plurality of affinities include at least one of the group consisting of: an affinity corresponding to a group of friends, an affinity corresponding to membership in a club or other organization, an affinity corresponding to an interest of the user of the device.

11. The device of claim 9, wherein the visual notification includes a particular color corresponding to the common affinity.

12. The device of claim 9, wherein the visual notification further comprises an additional visual element comprising text corresponding to the common affinity.

13. The device of claim 9, wherein the visual notification does not include any visual elements having text.

14. The device of claim 9, wherein one or more affinity codes are registered as being associated with the device in a memory of the device, and wherein the determination of whether a peer device shares an affinity code with the device is based on the one or more registered affinity codes.

15. The device of claim 9, wherein determining that the peer device shares an affinity in common with the device is based on the received signal, wherein the received signal includes one or more affinity codes of the peer device.

16. A device for signaling a common affinity with a peer device, comprising:
   a receiver for receiving a signal indicating that the peer device is within a vicinity of the device, wherein the signal includes an affinity code of the peer device;
   a processor, configured to determine that the peer device shares an affinity in common with the device based on the received affinity code of the peer device matching an affinity code associated with the device, wherein the common affinity is one of a plurality of affinities, each of the plurality of affinities being associated with a different affinity code; and
   one or more lights, configured to indicate to a user of the device and a user of the peer device that the peer device within the vicinity of the device shares a common affinity with the device based on the determination that the peer device shares the affinity in common with the device, by providing a visual notification comprising a visual element that does not utilize text;
   wherein the device is wearable such that the visual notification is visible to both the user of the device and the user of the peer device;
   wherein the one or more lights are further configured to provide multiple types of visual notifications.

17. The device of claim 16, further comprising:
   a memory, configured to store a plurality of affinity codes associated with the device.

18. The device of claim 16, wherein the plurality of affinities include at least one of the group consisting of: an affinity corresponding to a group of friends, an affinity corresponding to membership in a club or other organization, an affinity corresponding to an interest of the user of the device.

* * * * *